(12) United States Patent
Yararbas et al.

(10) Patent No.: US 12,169,133 B2
(45) Date of Patent: Dec. 17, 2024

(54) HEURISTIC EVALUATION SYSTEMS AND METHODS FOR SPATIAL INFORMATION DELIVERABILITY

(71) Applicant: Volvo Car Corporation, Gothenburg (SE)

(72) Inventors: Aykut Yararbas, San Jose, CA (US); Jon Seneger, Monte Sereno, CA (US); Amir Karim Esfahani, Los Altos, CA (US)

(73) Assignee: Volvo Car Corporation, Gothenburg (SE)

( * ) Notice: Subject to any disclaimer, the term of this patent is extended or adjusted under 35 U.S.C. 154(b) by 140 days.

(21) Appl. No.: 17/964,988

(22) Filed: Oct. 13, 2022

(65) Prior Publication Data
US 2023/0137791 A1     May 4, 2023

Related U.S. Application Data

(60) Provisional application No. 63/272,776, filed on Oct. 28, 2021.

(51) Int. Cl.
*G01C 21/34* (2006.01)
*G01C 21/36* (2006.01)

(52) U.S. Cl.
CPC ..... *G01C 21/3469* (2013.01); *G01C 21/3461* (2013.01); *G01C 21/3617* (2013.01); *G01C 21/3691* (2013.01)

(58) Field of Classification Search
CPC ........... G01C 21/3461; G01C 21/3469; G01C 21/3617; G01C 21/3679; G01C 21/3691; B60L 2240/36; B60L 2240/622; B60L 2240/662; B60L 2250/12; B60L 2250/16; B60L 53/66; B60L 53/67

See application file for complete search history.

(56) References Cited

U.S. PATENT DOCUMENTS

| | | | | |
|---|---|---|---|---|
| 5,790,976 | A * | 8/1998 | Boll | H02J 7/0048 |
| | | | | 701/25 |
| 10,723,230 | B2 * | 7/2020 | Mastrandrea | B60L 53/50 |
| 10,787,095 | B2 * | 9/2020 | Milding | B60L 58/12 |
| 10,793,018 | B2 * | 10/2020 | Imai | G08G 1/09675 |
| 10,875,412 | B1 * | 12/2020 | MacGregor | B60L 53/12 |
| 11,748,788 | B2 * | 9/2023 | Khoo | B60L 53/14 |
| | | | | 700/286 |
| 2009/0082037 | A1 * | 3/2009 | Ju | H04W 4/02 |
| | | | | 455/456.3 |
| 2012/0109519 | A1 * | 5/2012 | Uyeki | B60L 53/68 |
| | | | | 701/426 |

(Continued)

*Primary Examiner* — Carl C Staubach
(74) *Attorney, Agent, or Firm* — Clements Bernard Walker; Christopher L. Bernard; Devin Cummins

(57) ABSTRACT

Heuristic evaluation systems and methods for spatial information deliverability for electric vehicle (EV) owners who are traveling and looking for charging location suggestions via their navigation systems, mobile applications, and/or the like. Suggestions are captured based on prior knowledge and user desires. In general, the system knows that a user is traveling from point A to point B and has a suggested optimal distance and/or time and/or cost to reach point B. The systems gathers information related to the traveler's desires in relation to lesser known dimensions, to enhance the overall quality of the travel and charging experience.

20 Claims, 4 Drawing Sheets

(56) References Cited

U.S. PATENT DOCUMENTS

| | | | |
|---|---|---|---|
| 2019/0054833 A1* | 2/2019 | Öhman | B60L 53/14 |
| 2019/0178663 A1* | 6/2019 | Mukai | G01C 21/34 |
| 2019/0316924 A1* | 10/2019 | Morgan-Brown | G01C 21/3697 |
| 2020/0326197 A1* | 10/2020 | Li | G06F 16/29 |
| 2021/0180969 A1* | 6/2021 | Yamada | G01C 21/3469 |
| 2022/0282982 A1* | 9/2022 | Kitada | G01C 21/3476 |
| 2022/0309931 A1* | 9/2022 | T | G08G 5/0026 |
| 2023/0137791 A1* | 5/2023 | Yararbas | G01C 21/3679 701/123 |
| 2023/0153735 A1* | 5/2023 | Dhara | G06N 20/00 705/7.39 |
| 2023/0158916 A1* | 5/2023 | Haupt | G01C 21/3453 320/109 |
| 2024/0092217 A1* | 3/2024 | Anand | B60L 53/67 |
| 2024/0109676 A1* | 4/2024 | Ruslanovich | B64C 37/02 |
| 2024/0131948 A1* | 4/2024 | Ropel | B60L 53/66 |
| 2024/0131949 A1* | 4/2024 | Ropel | B60L 53/66 |
| 2024/0131951 A1* | 4/2024 | Ropel | H01M 10/48 |
| 2024/0133968 A1* | 4/2024 | Ropel | G01R 31/392 |
| 2024/0136842 A1* | 4/2024 | Ropel | H02J 7/007182 |

\* cited by examiner

HEURISTIC EVALUATION SYSTEMS AND METHODS FOR SPATIAL INFORMATION DELIVERABILITY

CROSS-REFERENCE TO RELATED APPLICATION

The present disclosure claims the benefit of priority of U.S. Provisional Patent Application No. 63/272,776, filed on Oct. 28, 2021, and entitled "HEURISTIC EVALUATION SYSTEMS AND METHODS FOR SPATIAL INFORMATION DELIVERABILITY," the contents of which are incorporated in full by reference herein.

TECHNICAL FIELD

The present disclosure relates generally to the automotive navigation and electric vehicle (EV) charging fields. More particularly, the present disclosure relates to heuristic evaluation systems and methods for spatial information deliverability.

BACKGROUND

Users traveling beyond the range of their current charge are faced with choices in the known dimensions of "time, distance, availability, and price/quality of service." The established trade-off in these dimensions might only answer and deliver on core service needs. The problem of how to meet demand with these resources is the best possible match. The user choice is focused squarely on the vehicle, and delivering the answer in relation to the vehicle dimension of moving from point A to point B most efficiently; within the context of "time, distance, availability, and price/quality of service."

The present background is provided by way of illustrative environmental context only. It will be readily apparent to those or ordinary skill in the art that the concepts and principles of the present disclosure may be implemented in other contexts equally, without limitation.

SUMMARY

The present disclosure provides heuristic evaluation systems and methods for spatial information deliverability for EV owners who are traveling and looking for charging location suggestions via their navigation systems, mobile applications, and/or the like. Suggestions are captured based on prior knowledge and user desires. In general, the system knows that a user is traveling from point A to point B and has a suggested optimal distance and/or time and/or cost to reach point B. The system gathers information related to the traveler's desires in relation to lesser known dimensions, to enhance the overall quality of the travel and charging experience.

In one illustrative embodiment, the present disclosure provides a heuristic evaluation system for spatial information deliverability, the system including: memory storing instructions executed by a processor to receive an origination point and a destination point from a user and determine and suggest charging station locations to the user traveling from the origination point to the destination point based on time and distance considerations, hardware capability and availability considerations, and user preference attributes received from the user; and a display operable for displaying an ordered list of scored charging station locations encompassing the suggestions to the user. The display is one of a vehicle navigation display and a mobile device display. Determining and suggesting charging station locations to the user traveling from the origination point to the destination point based on time and distance considerations includes: determining whether or not the destination point can be reached from the origination point without a charge; if the answer is no, then determining available charging locations along available routes between the origination point and the destination point that can be reached based on an available charge; and, if the answer is yes, then determining available charging locations proximate the destination point that can be reached subsequent to reaching the destination point based on the available charge. The ordered list of scored charging station locations is formulated based on one or more of: total travel time from the origination point to the destination point and each charging station received from one of a navigation system and a navigation application, air temperature along the route received from one or more of a vehicle and a mobile device, hardware temperature received from one or more of the vehicle and each charging station, an expected charging time received from one of the vehicle and each charging station, and an expected charging cost received from one of each charging station and an infrastructure database. The ordered list of scored charging station locations is also formulated based on one or more of: cost of available kWh during an expected charging time received from one of each charging station and an infrastructure database, cost of parking during the expected charging time received from one of each charging station and the infrastructure database, and available hardware received from one of each charging station and the infrastructure database. The ordered list of scored charging station locations is further formulated based on one or more of: weather conditions at each charging station received from one or more of each charging station and a weather database, expected time of day for charging at each charging station, reported crime rate at each charging station, and amenities available at each charging station.

In another illustrative embodiment, the present disclosure provides a heuristic evaluation method for spatial information deliverability, the method including: at a memory storing instructions executed by a processor, receiving an origination point and a destination point from a user and determining and suggesting charging station locations to the user traveling from the origination point to the destination point based on time and distance considerations, hardware capability and availability considerations, and user preference attributes received from the user; and, by a display, displaying an ordered list of scored charging station locations encompassing the suggestions to the user. The display is one of a vehicle navigation display and a mobile device display. Determining and suggesting charging station locations to the user traveling from the origination point to the destination point based on time and distance considerations includes: determining whether or not the destination point can be reached from the origination point without a charge; if the answer is no, then determining available charging locations along available routes between the origination point and the destination point that can be reached based on an available charge; and, if the answer is yes, then determining available charging locations proximate the destination point that can be reached subsequent to reaching the destination point based on the available charge. The ordered list of scored charging station locations is formulated based on one or more of: total travel time from the origination point to the destination point and each charging station received from one of a navigation system and a navigation application, air temperature along the route received from one or more of a vehicle and a mobile device, hardware temperature received from one or more of the vehicle and each charging station, an expected charging time received from one of the vehicle and each charging station, and an expected charging cost received from one of each charging station and an infrastructure database. The ordered list of scored charging station locations is also formulated based on one or more of: cost of available kWh during an expected charging time received from one of each charging station and an infrastructure database, cost of parking during the expected charging time received from one of each charging station and the infrastructure database, and available hardware received from one of each charging station and the infrastructure database. The ordered list of scored charging station locations is further formulated based on one or more of: weather conditions at each charging station received from one or more of each charging station and a weather database, expected time of day for charging at each charging station, reported crime rate at each charging station, and amenities available at each charging station. The method further includes, at a user interface associated with the display, receiving from the user a selection of a desired charging station of the ordered list of scored charging station locations and determining a route to the desired charging station and the destination point from a current location of the user.

In a further illustrative embodiment, the present disclosure provides a non-transitory computer-readable medium stored as instructions in a memory and executed by a processor to carry out steps including: receiving an origination point and a destination point from a user and determining and suggesting charging station locations to the user traveling from an origination point to the destination point based on time and distance considerations, hardware capability and availability considerations, and user preference attributes received from the user; and, by a display, displaying an ordered list of scored charging station locations encompassing the suggestions to the user. The display is one of a vehicle navigation display and a mobile device display. Determining and suggesting charging station locations to the user traveling from the origination point to the destination point based on time and distance considerations includes: determining whether or not the destination point can be reached from the origination point without a charge; if the answer is no, then determining available charging locations along available routes between the origination point and the destination point that can be reached based on an available charge; and, if the answer is yes, then determining available charging locations proximate the destination point that can be reached subsequent to reaching the destination point based on the available charge. The ordered list of scored charging station locations is formulated based on one or more of: total travel time from the origination point to the destination point and each charging station received from one of a navigation system and a navigation application, air temperature along the route received from one or more of a vehicle and a mobile device, hardware temperature received from one or more of the vehicle and each charging station, an expected charging time received from one of the vehicle and each charging station, and an expected charging cost received from one of each charging station and an infrastructure database. The ordered list of scored charging station locations is also formulated based on one or more of: cost of available kWh during an expected charging time received from one of each charging station and an infrastructure database, cost of parking during the expected charging time received from one of each charging station and the infrastructure database, and available hardware received from one of each charging station and the infrastructure database. The ordered list of scored charging station locations is further formulated based on one or more of: weather conditions at each charging station received from one or more of each charging station and a weather database, expected time of day for charging at each charging station, reported crime rate at each charging station, and amenities available at each charging station. The steps further include, at a user interface associated with the display, receiving from the user a selection of a desired charging station of the ordered list of scored charging station locations and determining a route to the desired charging station and the destination point from a current location of the user.

BRIEF DESCRIPTION OF THE DRAWINGS

The present disclosure is illustrated and described with reference to the various drawings, in which like reference numbers are used to denote like system components/method steps, as appropriate, and in which.

DETAILED DESCRIPTION

Figure 1:
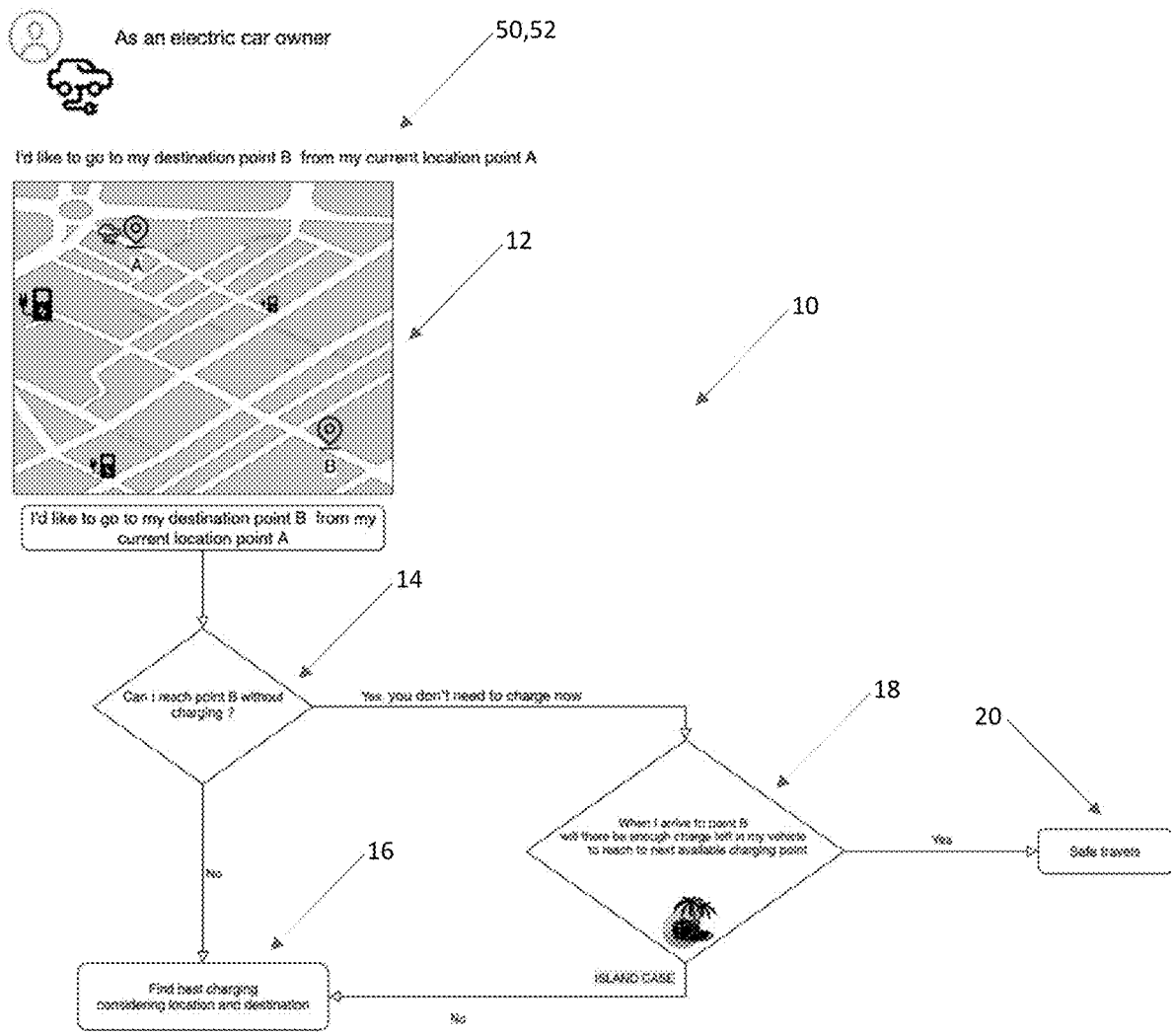
FIG. 1 is a flowchart illustrating one embodiment of the general method of the present disclosure.

Again, the present disclosure provides heuristic evaluation systems and methods for spatial information deliverability for EV owners who are traveling and looking for charging location suggestions via their navigation systems, mobile applications, and/or the like. Suggestions are captured based on prior knowledge and user desires. In general, the system knows that a user is traveling from point A to point B and has a suggested optimal distance and/or time and/or cost to reach point B. The systems gathers information related to the traveler's desires in relation to lesser known dimensions, to enhance the overall quality of the travel and charging experience.

Known dimensions in making EV charging suggestions include, for example:
    Preferred capabilities—Total time
      Total time to travel from point A to point B including—
        Time to charging station
      Time to get ready for charging
        Air temperature
        Hardware Temperature
      Total charging time
    Preferred capabilities—Money
      Cost of available kWh during charging time
      Charging station
        Cost reported per kWh
        Parking
Known requirements in making EV charging suggestions include, for example:
    Preferred capabilities—Distance
      Total distance from point A—Charging location (detours for charging)—Point B GeoSpatial—within a radius
    Search based on coordinates
Maps: Actual distance
    Point A—Point B
Required capabilities—Hardware matches
    Can I charge at the station, is my plug compatible?
    Wattage
        Vehicle capabilities: xkWh—nkWh
        Charging station max: ykWh
            x<y<n
    Plug type
        CCS combo
            Wattage configuration
        ChDemo
        Vehicle: aType
        Charging stations
            0 . . . n number of types Lesser known dimensions are used as a feedback mechanism for optimizing suggestions. If choice A is normally made, the system will provide preferred suggestions based on lesser known desires. Choice C may be scored 98% based on lesser used preferences in a highlighted list of matching desires, with choice B being 76%, and choice A being 23%.

Some lesser known dimensions include, for example:
Weather
    At the time of arrival, what is the projected weather
        Snow, rain, sunny
        Temperature
        Humidity
        Air quality
Available kWh for charging at a charge point
    Compared to the advertised kWh sticker, what is the actual available charging capability at the charging station for vehicle at the proposed time
Time-of-day at a charge point
    Arrive location at 5:30 pm, for example
Risk factors
    Crime rate statistics
    Financial factors
Amenities available
    Shade
    Open area
    Area with light
    Restaurants
    Shopping malls
    Manicure locations
    Massage spa, etc.
    Charge-and-park
Penalty for parking over threshold
    [YES/NO] with cost/hr Thus, the user preference is matched with multiple dimensions to reach point B, with considerations beyond distance and time of arrival.

FIG. 1 is a flowchart illustrating one embodiment of the general method 10 of the present disclosure. A user first queries their navigation system or mobile application 50 via an associated user interface/display 52 that he or she would like to proceed from current location point A to desired destination location point B 12. The first inquiry is whether or not point B can be reached without a charge 14. If the answer is no, then the system or application finds the best charging location(s) considering the location and destination 16. If the answer is yes, then a charge is not immediately needed and the inquiry becomes, upon arrival at point B, will there be enough charge in the vehicle to reach the next available charging point 18. If the answer is no, then the system or application again finds the best charging location(s) considering the location and destination 16. If the answer is yes, then the trip proceeds from point A to point B without charging intervention.

The following is a use case describing the solution of the present disclosure:
The question—I am traveling from point A to point B
Matching vehicle and charging point specifications (compatibility for optimal service)
    Type of charger, type of plug available
    Type of service—DC fast charge, AC slow charge
    Type of power—kWh, the strength of charge upper limit (kWh available at station, kWh receivable by vehicle in current state)
Realtime
Availability of service, is it booked, is it bookable, does it have/share the level of service when load-balancing for multiple vehicles charging
    Predictive analytics on the charger by charger with geo position
    Historical availability, when slots have been available
    Historical reliability, level of service in relation to time, weather conditions
    Load balancing, level of charge available when multiple vehicles are charging
Type of location
    Where is the charger located locally (lit, open, easily available in relation to service, bathroom, etc.)
    State of the machine (vehicle)
    State of charge current kWh
    The temperature of the battery (readiness to charge)
Response to the question—I am traveling from point A to point B
Answer to the query regarding travel to point B, machine to machine will be optimized for time-distance based on the knowledge available from map, service, and vehicle/profile
The answer will be based on variations on Estimated Time to Arrival (ETA) based on optimal dimensions understood by the query
At optimal answer to ETA, the options delivered will be weighted results with distribution of service according to time to distance
    Time is dominant weight (time is defined as time to arrival, and therefore delivering power availability (charging speed) uncoupled by cost unless cost is defined by the user as a dominant factor
    Distance is in relation to time but is not dominant in weighted response
    Availability is factored into time, predicted availability determined by historical insight, and therefore makes up the dominant weight
    Price is factored in with availability prediction, cost is given importance by the User
Shortest way/time spent on road/time spent on charger, fastest way in speed/time/time spent on a charger (no care for milage)
How do I want to distribute my resources to get from point A to point B based on the importance of each dimension?
User preferences surfaced up to for feedback (refinement of the parameters to enhance the answer):
Shorter time?
    Time spent charging (distributed on each charging location combined or optimized to limit stops at charging location)
    Time spent on the road
    Time to arrival Availability of service, is the charger available to me?
Higher in charging level at the point of arrival, shorter time spent at charger?
Shorter in distance?
Can I travel a shorter distance?
Is the speed at which I travel giving me optimal discharge for distance traveled?
Can I get there with the best convenience?
Convenience is related to the availability of utilities, crime rate, food, shelter, connectivity, etc.
Cost of service
Impact of cost on time spent using service
Impact of cost on quality of service, location in relation to time
Impact of cost in relation to convenience.
Scoring—based on desires—vector space model utilized The result is a set of charging locations. These charging locations are found by filtering charging locations based on required capabilities and sorted by the scoring of the sum of weighing known optional dimensions capabilities distance to desired optional capabilities and later scored by lesser known dimensions based on user choices.

So, a list of charging stations matching required attributes, Ri, is sorted by shortest time and distance. Required attributes collected from the vehicle include hardware requirements and distance to charge with remaining charge (the "island" case), for example. Preferred attributes, Pi, collected from the user or otherwise include amenities, risk factors, weather, time of day, kWh plus cost, parking penalties, etc. Charging point attributes, C-Pi, and user attributes, W-Pi, and weights collected from user input are also considered.

Thus, a vector space model is applied and a charging point scoring calculation is performed, providing a list of charging stations matching required attributes, sorted by the scoring determined by the user's desires and distance to actual values. The preferred attribute of a charging point matching a user's desired attribute is C-Pi*W-Pi. The score of a charging point is the sum of the weighted attributes of the charging point matching the user's desired attribute.

The following provides an example of the metadata utilized:

```
{
    "resource": {
        "spatial-position" : "Coordinate",
        "specifications": {
            "capacity": "Description of capacity",
            "compatibility": {
                "spefic-attribute": {
                    "name": " ",
                    "description": " "
                },
                "another-spefic-attribute": {
                    "name": " ",
                    "description": " "
                },
                "...." :"...."
            }
        }
    },
    "demand": Resource {
        {
            "spatial-position" : "Coordinate",
            "specifications": {
                "capacity": "Description of capacity",
                "compatibility": {
                    "spefic-attribute": {
                        "name": " ",
                        "description": " "
```

-continued

```
                        "required": true|false,
                        "computational": true|false,
                    },
                    "another-spefic-attribute": {
                        "name": " ",
                        "description": " "
                        "required": true|false
                    },
                    "computational-attribute": {
                        "name": "charging-time",
                        "description": " "
                        "required": true|false,
                        "computational": true
                        "compute-function": {
                            function compute (resource.specx, demand.specy) {
                                ....
                            }
                        }
                    },
                    "computational-attribute-2": {
                        "name": " ",
                        "description": " "
                        "required": true|false,
                        "computational": true
                        "compute-function": {
                            "stored-function": "functionx(resource, demand)"
                        }
                    },
                    "...." :"...."
                }
            }
        },
    }
}
```

The steps utilized are summarized as follows:

| Step | Actor | Description | Comment |
| --- | --- | --- | --- |
| 0-a | System | Knows required attributes | $R_I$ |
| 0-b | System | Knows preferred attributes | $P_I$ |
| 0-c | System | Knows charging point attributes | $C\text{-}P_I$ |
| 1 | Customer | Selects a desired location to travel to using an interface | |
| 2 | System | List of charging stations matching required attributes $R_I$ Sorted by shortest time and distance using an interface | |
| 3 | System | Displays the list of preferred attributes defined at 0-c using an interface | |
| 4 | Customer | Provides desired attributes and their weights from a user interface using an interface | $W\text{-}P_I$ |
| 5 | System | Calculates scoring of each charging point based on customers desires | See Charging point scoring calculation |
| 6 | System | List of charging stations matching required attributes Sorted by the scoring determined by customer's desires distance to actual values using an interface | |
| 7 | Customer | Picks a charging station from a user interface to travel to using an interface | |
| 8 | System | Doesn't pick a location from the list, the solution chooses the highest scored item in the list presented | |
| 9 | System | Adds the point of interest from list into the journey | |

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. It should be noted that the algorithms of the present disclosure may be implemented on an embedded processing system running a real time operating system (OS), which provides an assured degree of availability and low latency. As discussed below, processing in a cloud system may also be implemented if such availability and latency problems are addressed.

Figure 2:
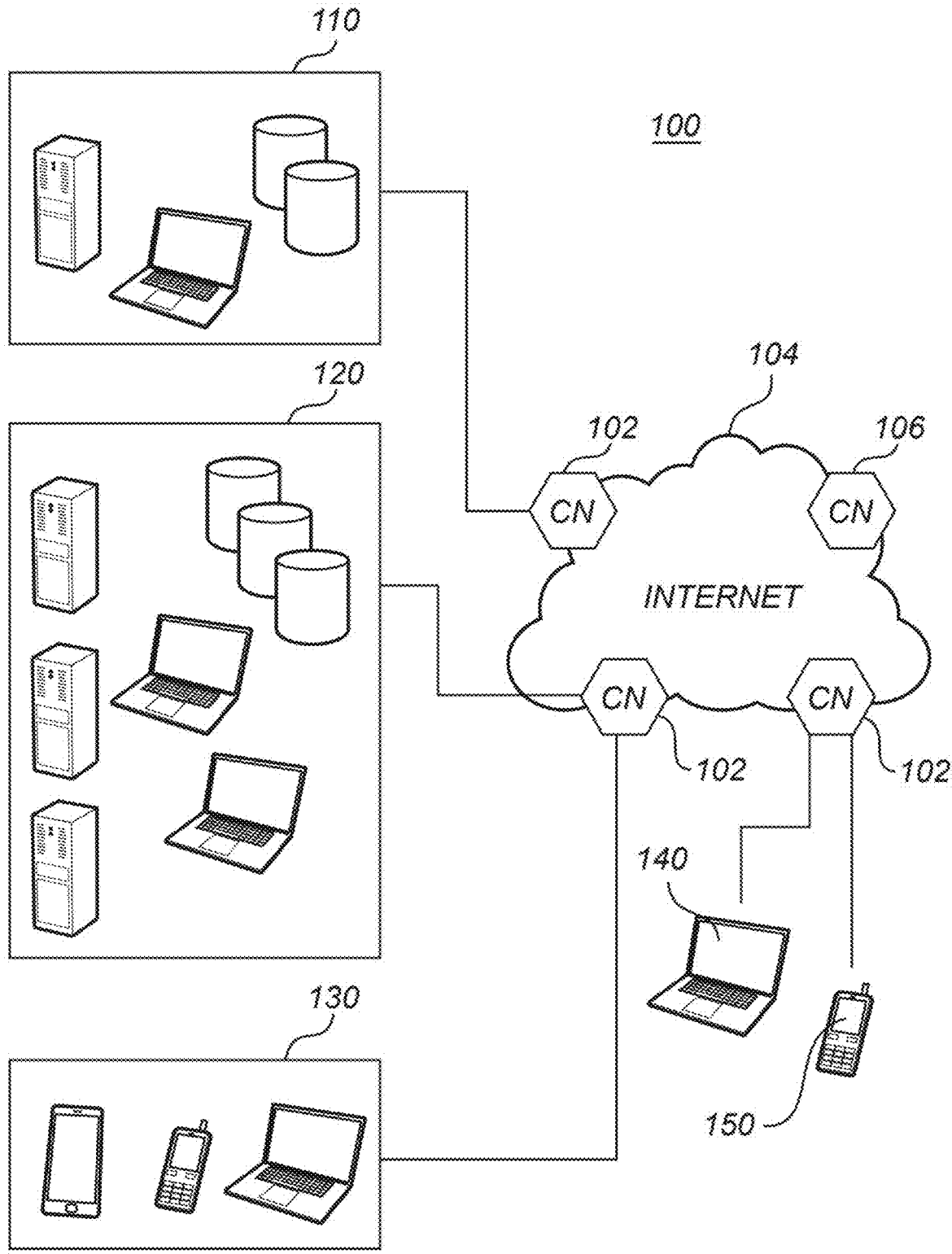
FIG. 2 is a network diagram of a cloud-based system for implementing the various systems and methods of the present disclosure.
Figure 3:
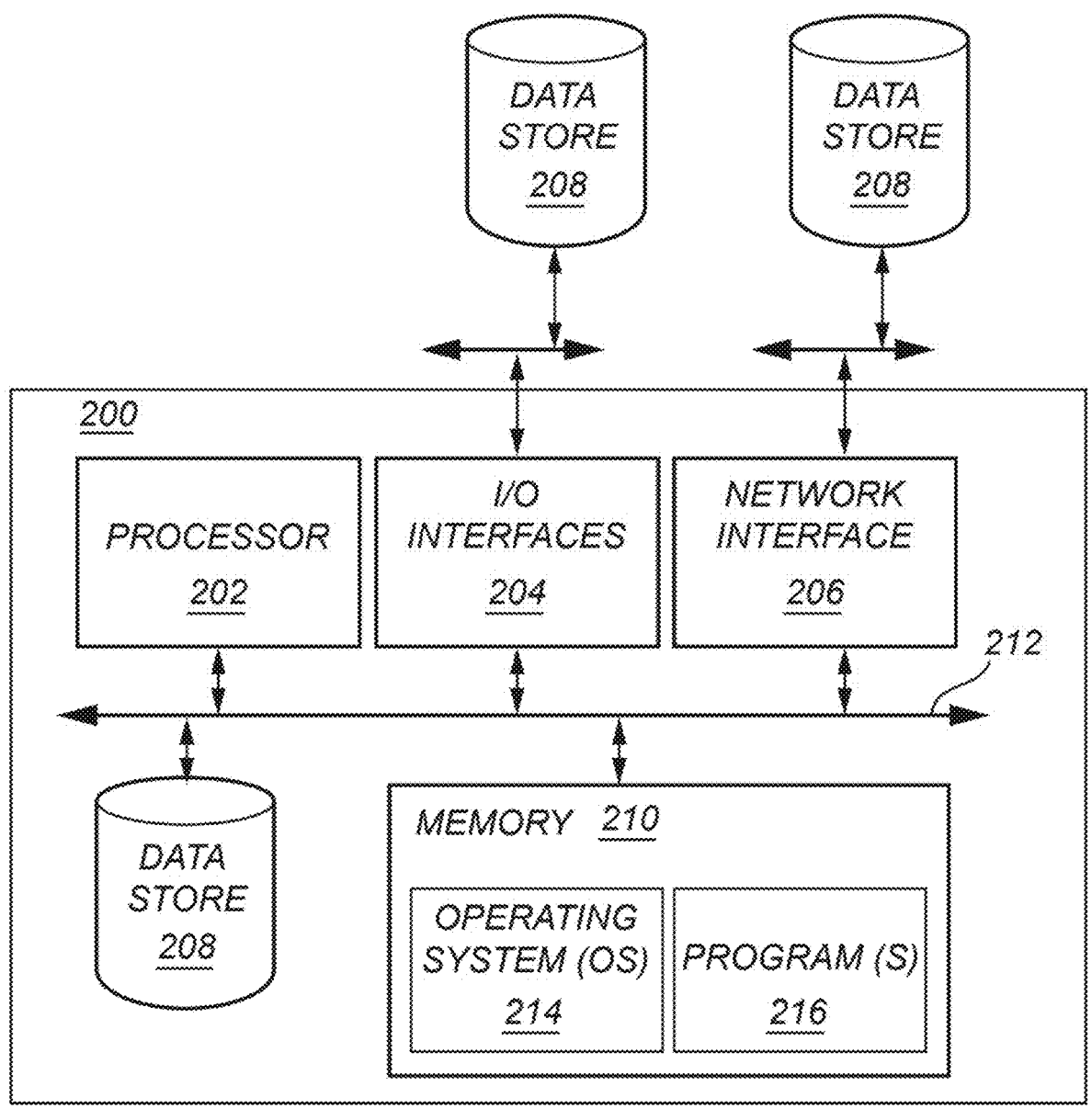
FIG. 3 is a block diagram of a server/processing system that may be used in the cloud-based system of FIG. 2 or stand-alone.

FIG. 2 is a network diagram of a cloud-based system 100 for implementing various cloud-based services of the present disclosure, where applicable. The cloud-based system 100 includes one or more cloud nodes (CNs) 102 communicatively coupled to the Internet 104 or the like. The cloud nodes 102 may be implemented as a server or other processing system 200 (as illustrated in FIG. 3) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various individual's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 3 is a block diagram of a server or other processing system 200, which may be used in the cloud-based system 100 (FIG. 2), in other systems, or stand-alone, such as in the vehicle itself. For example, the CNs 102 (FIG. 2) and the central authority nodes 106 (FIG. 2) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server or other processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 2). The network interface 206 may include, for example, an Ethernet card or adapter (e.g., 10 BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 4:
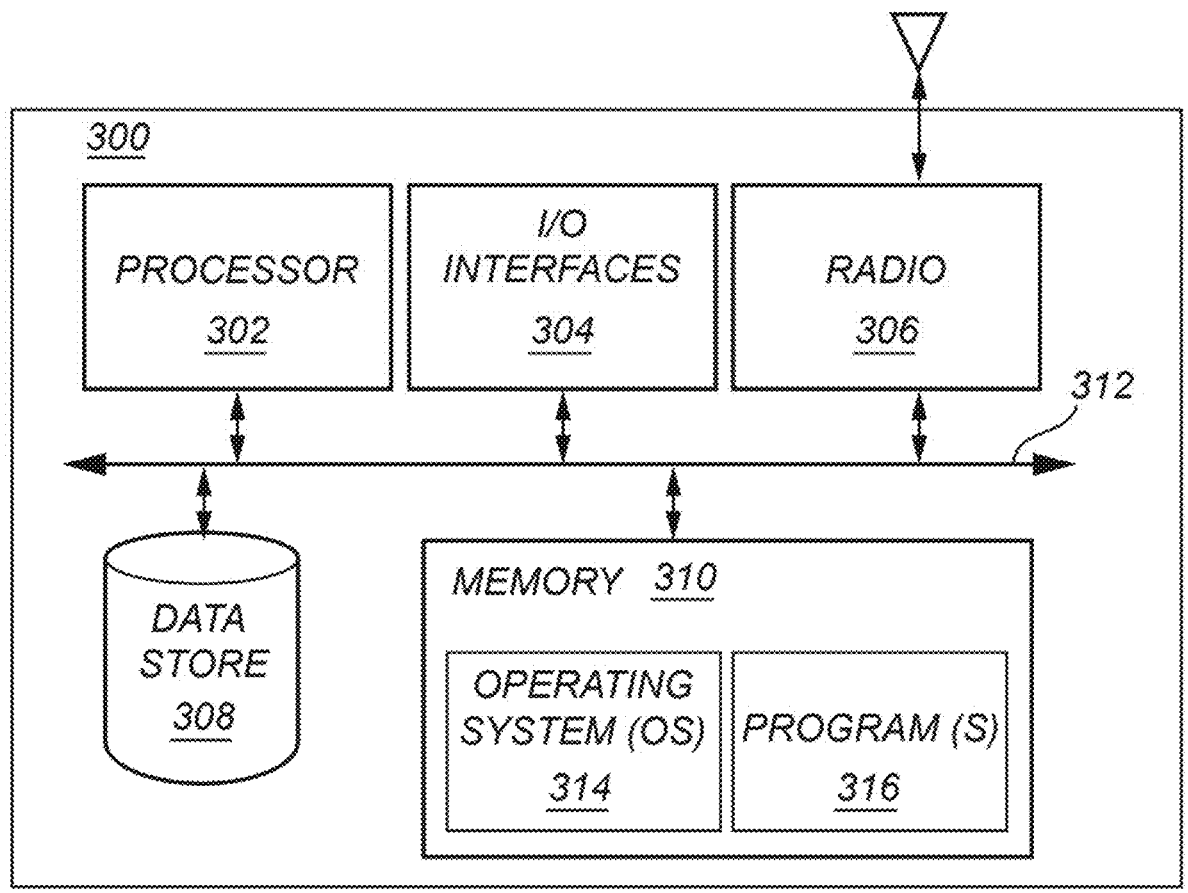
FIG. 4 is a block diagram of a remote device that may be used in the cloud-based system of FIG. 2 or stand-alone.

FIG. 4 is a block diagram of a user device 300, which may be used in the cloud-based system 100 (FIG. 2), as part of a network, or stand-alone. The user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 10, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 2).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A navigation and charging station recommendation system for an electric vehicle, the system comprising:
   memory storing instructions executed by a processor to receive an origination point and a destination point from a user and determine and suggest charging station locations to the user traveling from the origination point to the destination point based on time and distance considerations, charging hardware capability and availability considerations, and user preference attributes received from the user;
   the memory storing instructions executed by the processor to determine an ordered list of scored charging station locations by applying a vector space model to required attributes collected from the electric vehicle, charging point attributes collected from charging stations, and preferred attributes collected from the user, wherein an initial ordered list of scored charging station locations based on primary dimensions is refined to form an optimized ordered list of scored charging station locations using secondary dimensions as feedback to the vector space model;
   a display operable for displaying the optimized ordered list of scored charging station locations encompassing the suggestions to the user.

2. The system of claim 1, wherein the display is one of a vehicle navigation display and a mobile device display.

3. The system of claim 1, wherein determining and suggesting charging station locations to the user traveling from the origination point to the destination point based on time and distance considerations comprises:
   determining whether or not the destination point can be reached from the origination point without a charge;
   if the answer is no, then determining available charging locations along available routes between the origination point and the destination point that can be reached based on an available charge; and
   if the answer is yes, then determining available charging locations proximate the destination point that can be reached subsequent to reaching the destination point based on the available charge.

4. The system of claim 1, wherein the ordered list of scored charging station locations is formulated based on one or more of: total travel time from the origination point to the destination point and each charging station received from one of a navigation system and a navigation application, air temperature along the route received from one or more of the vehicle and a mobile device, charging hardware temperature received from one or more of the vehicle and each charging station, an expected charging time received from one of the vehicle and each charging station, and an expected charging cost received from one of each charging station and an infrastructure database.

5. The system of claim 1, wherein the ordered list of scored charging station locations is formulated based on one or more of: cost of available kWh during an expected charging time received from one of each charging station and an infrastructure database, cost of parking during the expected charging time received from one of each charging station and the infrastructure database, and available charging hardware received from one of each charging station and the infrastructure database.

6. The system of claim 1, wherein the ordered list of scored charging station locations is formulated based on one or more of: weather conditions at each charging station received from one or more of each charging station and a weather database, expected time of day for charging at each charging station, reported crime rate at each charging station, and amenities available at each charging station.

7. A navigation and charging station recommendation method for an electric vehicle, the method comprising:
   receiving an origination point and a destination point from a user and determining and suggesting charging station locations to the user traveling from the origination point to the destination point based on time and distance considerations, charging hardware capability and availability considerations, and user preference attributes received from the user;
   determining an ordered list of scored charging station locations by applying a vector space model to required attributes collected from the electric vehicle, charging point attributes collected from charging stations, and preferred attributes collected from the user, wherein an initial ordered list of scored charging station locations based on primary dimensions is refined to form an optimized ordered list of scored charging station locations using secondary dimensions as feedback to the vector space model;

displaying by a display the optimized ordered list of scored charging station locations encompassing the suggestions to the user.

8. The method of claim 7, wherein the display is one of a vehicle navigation display and a mobile device display.

9. The method of claim 7, wherein determining and suggesting charging station locations to the user traveling from the origination point to the destination point based on time and distance considerations comprises:
determining whether or not the destination point can be reached from the origination point without a charge;
if the answer is no, then determining available charging locations along available routes between the origination point and the destination point that can be reached based on an available charge; and
if the answer is yes, then determining available charging locations proximate the destination point that can be reached subsequent to reaching the destination point based on the available charge.

10. The method of claim 7, wherein the ordered list of scored charging station locations is formulated based on one or more of: total travel time from the origination point to the destination point and each charging station received from one of a navigation system and a navigation application, air temperature along the route received from one or more of the vehicle and a mobile device, charging hardware temperature received from one or more of the vehicle and each charging station, an expected charging time received from one of the vehicle and each charging station, and an expected charging cost received from one of each charging station and an infrastructure database.

11. The method of claim 7, wherein the ordered list of scored charging station locations is formulated based on one or more of: cost of available kWh during an expected charging time received from one of each charging station and an infrastructure database, cost of parking during the expected charging time received from one of each charging station and the infrastructure database, and available charging hardware received from one of each charging station and the infrastructure database.

12. The method of claim 7, wherein the ordered list of scored charging station locations is formulated based on one or more of: weather conditions at each charging station received from one or more of each charging station and a weather database, expected time of day for charging at each charging station, reported crime rate at each charging station, and amenities available at each charging station.

13. The method of claim 7, further comprising, at a user interface associated with the display, receiving from the user a selection of a desired charging station of the ordered list of scored charging station locations and determining a route to the desired charging station and the destination point from a current location of the user.

14. A non-transitory computer-readable medium stored as instructions in a memory and executed by a processor to carry out steps comprising:
receiving an origination point and a destination point from a user and determining and suggesting charging station locations to the user traveling from an origination point to the destination point based on time and distance considerations, charging hardware capability and availability considerations, and user preference attributes received from the user;
determining an ordered list of scored charging station locations by applying a vector space model to required attributes collected from a vehicle, charging point attributes collected from charging stations, and preferred attributes collected from the user, wherein an initial ordered list of scored charging station locations based on primary dimensions is refined to form an optimized ordered list of scored charging station locations using secondary dimensions as feedback to the vector space model;
displaying by a display the optimized ordered list of scored charging station locations encompassing the suggestions to the user.

15. The non-transitory computer-readable medium of claim 14, wherein the display is one of a vehicle navigation display and a mobile device display.

16. The non-transitory computer-readable medium of claim 14, wherein determining and suggesting charging station locations to the user traveling from the origination point to the destination point based on time and distance considerations comprises:
determining whether or not the destination point can be reached from the origination point without a charge;
if the answer is no, then determining available charging locations along available routes between the origination point and the destination point that can be reached based on an available charge; and
if the answer is yes, then determining available charging locations proximate the destination point that can be reached subsequent to reaching the destination point based on the available charge.

17. The non-transitory computer-readable medium of claim 14, wherein the ordered list of scored charging station locations is formulated based on one or more of: total travel time from the origination point to the destination point and each charging station received from one of a navigation system and a navigation application, air temperature along the route received from one or more of the vehicle and a mobile device, charging hardware temperature received from one or more of the vehicle and each charging station, an expected charging time received from one of the vehicle and each charging station, and an expected charging cost received from one of each charging station and an infrastructure database.

18. The non-transitory computer-readable medium of claim 14, wherein the ordered list of scored charging station locations is formulated based on one or more of: cost of available kWh during an expected charging time received from one of each charging station and an infrastructure database, cost of parking during the expected charging time received from one of each charging station and the infrastructure database, and available charging hardware received from one of each charging station and the infrastructure database.

19. The non-transitory computer-readable medium of claim 14, wherein the ordered list of scored charging station locations is formulated based on one or more of: weather conditions at each charging station received from one or more of each charging station and a weather database, expected time of day for charging at each charging station, reported crime rate at each charging station, and amenities available at each charging station.

20. The non-transitory computer-readable medium of claim 14, the steps further comprising, at a user interface associated with the display, receiving from the user a selection of a desired charging station of the ordered list of scored charging station locations and determining a route to the desired charging station and the destination point from a current location of the user.

* * * * *